(12) United States Patent
Gao et al.

(10) Patent No.: US 9,929,827 B2
(45) Date of Patent: Mar. 27, 2018

(54) WAVELENGTH NEGOTIATION METHOD AND APPARATUS OF MULTI-WAVELENGTH PASSIVE OPTICAL NETWORK, AND MULTI-WAVELENGTH PASSIVE OPTICAL NETWORK SYSTEM

(71) Applicant: Huawei Technologies Co., Ltd., Shenzhen (CN)

(72) Inventors: Bo Gao, Wuhan (CN); Jianhe Gao, Wuhan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/243,627

(22) Filed: Aug. 22, 2016

(65) Prior Publication Data

US 2016/0359580 A1 Dec. 8, 2016

Related U.S. Application Data

(63) Continuation of application No. 14/594,847, filed on Jan. 12, 2015, now Pat. No. 9,438,368, which is a
(Continued)

(51) Int. Cl.
*H04J 14/02* (2006.01)

(52) U.S. Cl.
CPC ........ *H04J 14/0246* (2013.01); *H04J 14/025* (2013.01); *H04J 14/0247* (2013.01);
(Continued)

(58) Field of Classification Search
CPC .................................. H04J 14/0227–14/0252
See application file for complete search history.

(56) References Cited

U.S. PATENT DOCUMENTS

2007/0092256 A1 4/2007 Nozue et al.
2007/0230957 A1 10/2007 Ozaki
(Continued)

FOREIGN PATENT DOCUMENTS

CN 1925370 A 3/2007
CN 101222279 A 7/2008
(Continued)

OTHER PUBLICATIONS

"Draft document of G.multi," Telecommunication Standardization Sector, COM2-C1849-E, Study Group 2-Contribution 1849, pp. 1-15, International Telecommunication Union (Nov. 2011).
(Continued)

*Primary Examiner* — David Payne
*Assistant Examiner* — Casey Kretzer
(74) *Attorney, Agent, or Firm* — Leydig, Voit & Mayer, Ltd.

(57) ABSTRACT

This application provides a wavelength negotiation method of a multi-wavelength passive optical network, including: receiving a wavelength status table that is broadcast by an OLT over each downstream wavelength channel of a multi-wavelength PON system, where the wavelength status table is used to indicate information about available wavelengths of the multi-wavelength PON system and statistic information of registered ONUs of a corresponding wavelength channel; selecting an upstream transmit wavelength and a downstream receive wavelength according to the wavelength status table; and reporting information about the upstream transmit wavelength and information about the downstream receive wavelength to the OLT so that the OLT refreshes the wavelength status table. This application also provides a wavelength negotiation apparatus of the multi-wavelength passive optical network and a multi-wavelength passive optical network system.

12 Claims, 6 Drawing Sheets

Related U.S. Application Data continuation of application No. PCT/CN2012/078603, filed on Jul. 13, 2012.

(52) U.S. Cl.
CPC ...... *H04J 14/0252* (2013.01); *H04J 14/0257* (2013.01); *H04J 14/0267* (2013.01); *H04J 14/0282* (2013.01)

(56) References Cited

U.S. PATENT DOCUMENTS

| | | |
|---|---|---|
| 2007/0264011 A1 | 11/2007 | Sone et al. |
| 2008/0166127 A1 | 7/2008 | Kazawa et al. |
| 2010/0221007 A1 | 9/2010 | Sakamoto et al. |
| 2012/0008958 A1* | 1/2012 | Dahlfort ............ H04J 14/0282 398/85 |
| 2012/0315040 A1 | 12/2012 | Dahlfort |
| 2013/0094861 A1* | 4/2013 | Luo ................ H04J 14/0278 398/68 |
| 2013/0094862 A1* | 4/2013 | Luo ................ H04J 14/0278 398/68 |

FOREIGN PATENT DOCUMENTS

| | | |
|---|---|---|
| CN | 101355387 A | 1/2009 |
| CN | 101742365 A | 6/2010 |
| CN | 102104812 A | 6/2011 |
| EP | 0869634 A2 | 10/1998 |
| EP | 1978653 A1 | 10/2008 |
| EP | 2753010 A1 | 7/2014 |
| JP | 2008147913 A | 6/2008 |
| JP | 2008172351 A | 7/2008 |
| JP | 2011228800 A | 11/2011 |
| WO | WO 2010064981 A1 | 6/2010 |
| WO | WO 2011097728 A1 | 8/2011 |

OTHER PUBLICATIONS

McGarry et al., "An Evolutionary WDM Upgrade for EPONs," Technical Report, Arizona State University, Tempe, Arizona (2005).

"Series G: Transmission Systems and Media, Digital Systems and Networks; Digital sections and digital line system—Optical line systems for local and access networks; Phoneline networking transceivers—Isolation function," Recommendation ITU-T G.989.3, pp. i-14, International Telecommunication Union, Geneva, Switzerland (Mar. 2003).

* cited by examiner

WAVELENGTH NEGOTIATION METHOD AND APPARATUS OF MULTI-WAVELENGTH PASSIVE OPTICAL NETWORK, AND MULTI-WAVELENGTH PASSIVE OPTICAL NETWORK SYSTEM

CROSS-REFERENCE TO RELATED APPLICATION

This application is a continuation of U.S. patent application Ser. No. 14/594,847, filed on Jan. 12, 2015, which claims priority to International Application No. PCT/CN2012/078603, filed on Jul. 13, 2012. The afore-mentioned patent applications are hereby incorporated by reference in their entireties.

TECHNICAL FIELD

This application mainly relates to optical communications technologies, and in particular, to a wavelength negotiation method and apparatus of a multi-wavelength passive optical network (Passive Optical Network, PON), and a multi-wavelength passive optical network system.

BACKGROUND

A passive optical network (PON) technology is currently a main broadband access technology. A conventional PON system is a point-to-multipoint network system based on a time division multiplexing (Time Division Multiplexing, TDM) mechanism. Referring to FIG. 1, the PON system generally includes an optical line terminal (Optical Line Terminal, OLT) located on a central office side, multiple optical network units (Optical Network Unit, ONU) located on a user side, and an optical distribution network (Optical Distribution Network, ODN) between the OLT and the ONUs. The ODN is used to distribute or multiplex data signals between the OLT and the ONUs so that the multiple ONUs can share an optical transmission path. In the PON system based on the TDM mechanism, a direction from the OLT to the ONUs is called downstream, the OLT broadcasts a downstream data stream to all the ONUs in a TDM manner, and each ONU receives only the data that carries an identifier of the ONU; a direction from the ONUs to the OLT is called upstream. Because all the ONUs share the optical transmission path, in order to prevent a conflict of upstream data between the ONUs, the PON system uses a Time Division Multiple Access (Time Division Multiple Access, TDMA) manner in the upstream direction. That is, the OLT allocates a timeslot to each ONU, and each ONU sends upstream data in strict accordance with the timeslot allocated by the OLT.

However, the PON system is affected by a time division characteristic of the TDM mechanism, and available bandwidth of a user is generally restricted. In addition, available bandwidth of a fiber itself cannot be effectively used. Therefore, emerging broadband network application service requirements cannot be satisfied. To solve such a problem and in view of compatibility with an existing PON system, a hybrid PON system that integrates a wavelength division multiplexing (Wavelength Division Multiplexing, WDM) technology and the TDM technology is put forward in the industry. In the hybrid PON, multiple wavelength channels are used between an OLT on a central office side and ONUs on a user side to receive and send data. That is, the hybrid PON system is a multi-wavelength PON system.

In the multi-wavelength PON system, the OLT supports data sending and receiving performed simultaneously by using multiple wavelength channels. Each ONU works on one of the wavelength channels separately. In the downstream direction, the OLT uses a downstream wavelength corresponding to each wavelength channel to broadcast downstream data to multiple ONUs that work on the wavelength channel; in the upstream direction, an ONU on each wavelength channel may, in a timeslot allocated by the OLT, send upstream data to the OLT by using an upstream wavelength of the wavelength channel. To reduce warehousing costs, the ONU generally uses a wavelength-tunable optical transceiver component. Therefore, during initialization, the ONU needs to negotiate with the OLT to agree on a pair of working wavelengths by means of wavelength negotiation.

In the existing multi-wavelength PON system, in a wavelength negotiation process during initialization of the ONU, the ONU generally selects working wavelengths at random, and then the OLT detects whether a wavelength conflict occurs between the working wavelengths selected by the ONU and those of other ONUs. If the wavelength conflict occurs, the OLT delivers a conflict indication to the ONU. After receiving the conflict indication, the ONU selects other working wavelengths after a random delay. However, the foregoing method completely depends on that the ONU selects the wavelengths by itself and negotiates with the OLT, and, if a wavelength conflict occurs, new wavelengths are selected for negotiation, which leads to long registration time of the ONU and may interfere with normal communication of the other ONUs.

SUMMARY

This application provides a wavelength negotiation method of a multi-wavelength PON system, where the method can effectively shorten time in which an ONU registers and goes online and prevent interference on communication of other ONUs. In addition, based on the wavelength negotiation method, this application further provides a multi-wavelength passive optical network system and a wavelength negotiation apparatus.

According to one aspect, a wavelength negotiation method of a multi-wavelength passive optical network includes: receiving a wavelength status table that is broadcast by an OLT over each downstream wavelength channel of a multi-wavelength PON system, where the wavelength status table is used to indicate information about available wavelengths of the multi-wavelength PON system and statistic information of registered ONUs of a corresponding wavelength channel; selecting an upstream transmit wavelength and a downstream receive wavelength according to the wavelength status table; and reporting information about the upstream transmit wavelength and information about the downstream receive wavelength to the OLT so that the OLT refreshes the wavelength status table.

As improvement of the wavelength negotiation method, the wavelength status table includes a list of currently available upstream wavelengths and a list of currently available downstream wavelengths, and the number of registered ONUs of a wavelength channel corresponding to each wavelength in the list of the available upstream wavelengths and the list of the available downstream wavelengths.

As improvement of the wavelength negotiation method, the wavelength status table includes a binding relationship list of currently available upstream/downstream transmit/ receive wavelengths, and the number of registered ONUs of a wavelength channel corresponding to each upstream/downstream transmit/receive wavelength pair in the binding relationship list of the currently available upstream/downstream transmit/receive wavelengths.

As improvement of the wavelength negotiation method, the selecting an upstream transmit wavelength and a downstream receive wavelength according to the wavelength status table includes: selecting an upstream transmit wavelength and a downstream receive wavelength with a smaller number of registered ONUs or selecting an upstream/downstream transmit/receive wavelength pair with a smaller number of registered ONUs according to the number of registered ONUs of the wavelength channel corresponding to each upstream/downstream wavelength or each upstream/downstream transmit/receive wavelength pair recorded in the wavelength status table and in view of a transmit/receive wavelength capability supported by the ONUs.

As improvement of the wavelength negotiation method, the wavelength negotiation method further includes: performing wavelength initialization before sending a registration request and configuring a temporary downstream receive wavelength, where the wavelength status table is received from a corresponding downstream wavelength channel by means of the temporary downstream receive wavelength.

As improvement of the wavelength negotiation method, the performing wavelength initialization before sending a registration request and configuring a temporary downstream receive wavelength include: searching for downstream data from the OLT by gradually adjusting the downstream receive wavelength before sending the registration request; and when it is found that a downstream optical signal can be received from the OLT over a downstream receive wavelength to which the downstream receive wavelength is currently adjusted and that a correct downstream data frame can be obtained by parsing the downstream optical signal, configuring the current downstream receive wavelength as the temporary downstream receive wavelength and stopping the adjustment of the downstream receive wavelength.

As improvement of the wavelength negotiation method, the wavelength negotiation method further includes: generating a corresponding wavelength mapping relationship table entry after the OLT receives an upstream data frame or an upstream message that carries the information about the upstream transmit wavelength and the information about the downstream receive wavelength, where the wavelength mapping relationship table entry may include ONU identification information and the information about the upstream transmit wavelength and the information about the downstream receive wavelength of the ONUs; and refreshing, by the OLT, statistic information of registered ONUs of a wavelength channel corresponding to the information about the upstream transmit wavelength and information about a downstream transmit wavelength in the wavelength status table according to the wavelength mapping relationship table entry.

As improvement of the wavelength negotiation method, the wavelength negotiation method further includes: refreshing, by the OLT, the wavelength status table according to a wavelength mapping table entry corresponding to a loss of signal alarm when detecting the loss of signal alarm; and deleting, by the OLT, corresponding wavelength status information of the wavelength status table when detecting a fault of a transceiver component of the OLT.

As improvement of the wavelength negotiation method, the wavelength negotiation method further includes: reporting an ONU wavelength capability set to the OLT when sending a registration request or after registration succeeds; and receiving a wavelength status subtable that is reconstructed and returned in a unicast manner by the OLT when it is determined that the upstream transmit wavelength or the downstream receive wavelength selected by the ONU does not meet an expected wavelength requirement, and selecting a new upstream transmit wavelength and a new downstream receive wavelength according to the wavelength status subtable, where the wavelength status subtable includes information about available wavelengths in transmit/receive wavelengths supported by the ONU and the statistic information of the registered ONUs of the corresponding wavelength channel.

According to another aspect, a wavelength negotiation apparatus of a multi-wavelength passive optical network includes: an optical receiver, configured to receive a wavelength status table that is broadcast by an OLT over each downstream wavelength channel of a multi-wavelength PON system, where the wavelength status table is used to indicate information about available wavelengths of the multi-wavelength PON system and statistic information of registered ONUs of a corresponding wavelength channel; a processor, configured to select an upstream transmit wavelength and a downstream receive wavelength according to the wavelength status table; and an optical transmitter, configured to report information about the upstream transmit wavelength and information about the downstream receive wavelength to the OLT so that the OLT refreshes the wavelength status table.

As improvement of the wavelength negotiation apparatus, the wavelength status table includes a list of currently available upstream wavelengths and a list of currently available downstream wavelengths, and the number of registered ONUs of a wavelength channel corresponding to each wavelength in the list of the available upstream wavelengths and the list of the available downstream wavelengths.

As improvement of the wavelength negotiation apparatus, the processor includes: a wavelength information obtaining module, configured to: obtain, from the list of the currently available upstream wavelengths and the list of the currently available downstream wavelengths, information about the available upstream wavelengths and information about the available downstream wavelengths, and the number of registered ONUs of a wavelength channel corresponding to each available upstream wavelength or each available downstream wavelength; and a wavelength selecting module, configured to select an available upstream wavelength and an available downstream wavelength that correspond to a wavelength channel with a smaller number of registered ONUs as the upstream transmit wavelength and the downstream receive wavelength respectively.

As improvement of the wavelength negotiation apparatus, the wavelength status table includes a binding relationship list of currently available upstream/downstream transmit/receive wavelengths, and the number of registered ONUs of a wavelength channel corresponding to each upstream/downstream transmit/receive wavelength pair in the binding relationship list of the currently available upstream/downstream transmit/receive wavelengths.

As improvement of the wavelength negotiation apparatus, the processor includes: a wavelength information obtaining module, configured to: obtain, from the binding relationship list of the available upstream/downstream transmit/receive wavelengths, information about available upstream/downstream transmit/receive wavelength pairs, and the number of registered ONUs of a wavelength channel corresponding to information about each available upstream/downstream transmit/receive wavelength pair; and a wavelength selecting module, configured to select an available upstream/downstream transmit/receive wavelength pair that corresponds to a wavelength channel with a smaller number of registered ONUs as the upstream transmit wavelength and the downstream receive wavelength.

As improvement of the wavelength negotiation apparatus, the processor is further configured to perform wavelength initialization before sending a registration request, and configure a temporary downstream receive wavelength, where the temporary downstream receive wavelength is used as a receive wavelength for receiving the wavelength status table.

As improvement of the wavelength negotiation apparatus, the processor includes: a wavelength adjusting module, configured to search for downstream data from the OLT by gradually adjusting the downstream receive wavelength before sending the registration request; and a temporary wavelength configuring module, configured to: when it is found that a downstream optical signal can be received from the OLT over a downstream receive wavelength to which the downstream receive wavelength is currently adjusted and that a correct downstream data frame can be obtained by parsing the downstream optical signal, configure the current downstream receive wavelength as the temporary downstream receive wavelength and stop the adjustment of the downstream receive wavelength.

As improvement of the wavelength negotiation apparatus, the optical transmitter is further configured to report an ONU wavelength capability set to the OLT when sending a registration request or after registration succeeds; the optical receiver is further configured to receive a wavelength status subtable that is reconstructed and returned in a unicast manner by the OLT when it is determined that the selected upstream transmit wavelength or downstream receive wavelength does not meet an expected wavelength requirement; and the processor is further configured to select a new upstream transmit wavelength and a new downstream receive wavelength according to the wavelength status subtable, where the wavelength status subtable includes information about available wavelengths in transmit/receive wavelengths supported by the ONU and the statistic information of the registered ONUs of the corresponding wavelength channel.

According to another aspect, a multi-wavelength passive optical network system includes at least one OLT and multiple ONUs, where the at least one OLT is connected to the multiple ONUs in a point-to-multipoint manner by using an optical distribution network, where the ONUs include the wavelength negotiation apparatus of the multi-wavelength passive optical network described above.

In the wavelength negotiation method and apparatus of the multi-wavelength PON and the multi-wavelength PON system provided in this application, by receiving a wavelength status table broadcast by an OLT, an ONU may learn wavelength status information of each wavelength channel of the multi-wavelength PON system and select a proper working wavelength in view of a wavelength capability of the ONU, so as to prevent a need of re-negotiation caused by a wavelength conflict of the wavelength selected by the ONU, which can shorten registration time on the one hand and can prevent interference on communication of other normally working ONUs on the other hand. In addition, the ONU selects the working wavelength according to wavelength status information of each wavelength channel, which can also implement load balancing between all wavelength channels and improve overall performance of the multi-wavelength PON system.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
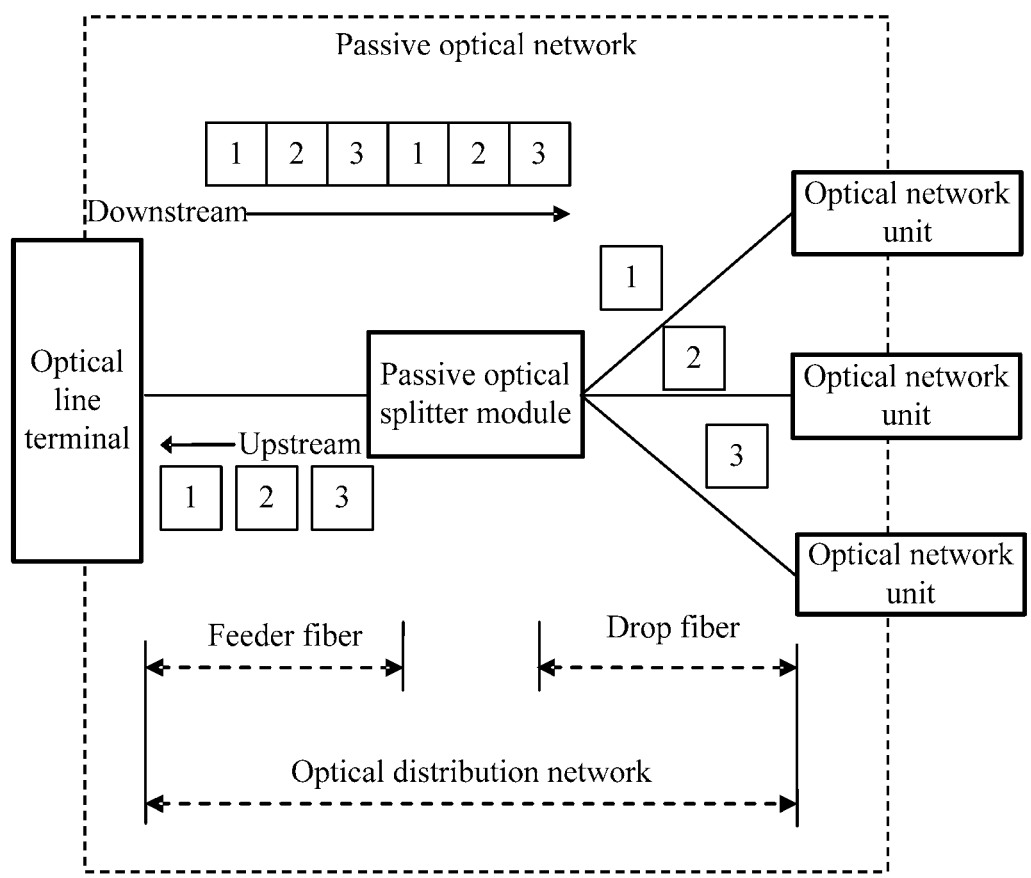
FIG. 1 is a schematic diagram of a network architecture of a passive optical network system based on a time division multiplexing mechanism.
Figure 2:
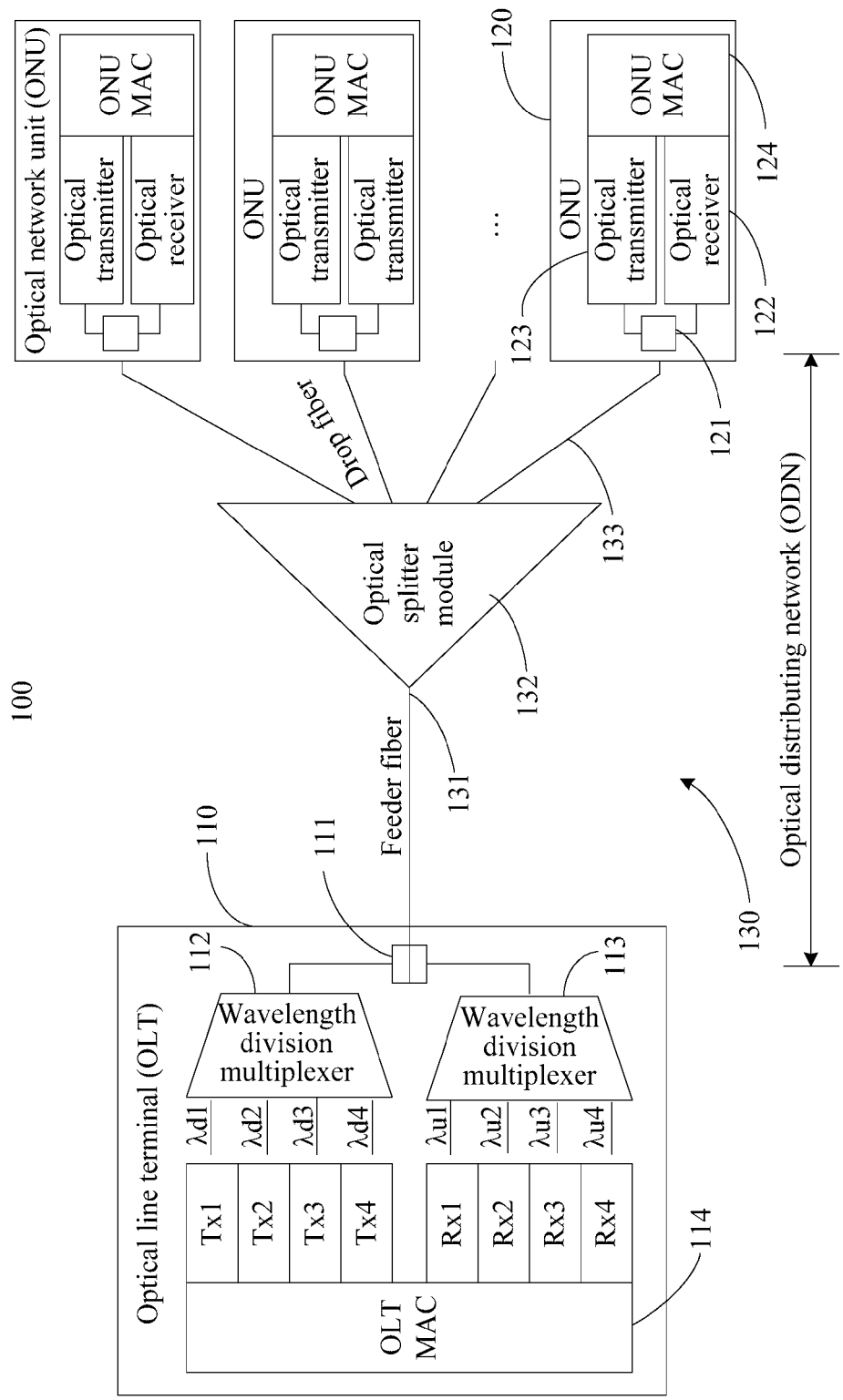
FIG. 2 is a schematic diagram of a network architecture in an embodiment of a multi-wavelength passive optical network system according to the present application.

Refer to FIG. 2, which is a schematic diagram of a network architecture of a multi-wavelength passive optical network system according to an embodiment of the present application. The multi-wavelength PON system 100 includes at least one optical line terminal (OLT) 110, multiple optical network units (ONU) 120, and one optical distribution network (ODN) 130, where the OLT 110 is connected to the multiple ONUs 120 in a point-to-multipoint manner by using the ODN 130, and the multiple ONUs 120 share an optical transmission medium of the ODN 130. The ODN 130 may include a feeder fiber 131, an optical splitter module 132, and multiple drop fibers 133, where the optical splitter module 132 may be disposed at a remote node (Remote Node, RN). The optical splitter module is connected to the OLT 110 by using the feeder fiber 131 on the one hand and connected to the multiple ONUs 120 separately by using the multiple drop fibers 133 on the other hand.

In the multi-wavelength PON system 100, a communication link between the OLT 110 and the multiple ONUs 120 may include multiple upstream wavelength channels and multiple downstream wavelength channels. In a downstream direction, the multiple downstream wavelength channels also share the optical transmission medium of the ODN in a wavelength division multiplexing (WDM) manner, each ONU 120 may work on one of the downstream wavelength channels of the multi-wavelength PON system 100, and each downstream wavelength channel may carry downstream services of one or more ONUs 120; the ONUs 120 that work on a same downstream wavelength channel may share the downstream wavelength channel in a Time Division Multiple Access (TDMA) manner. In an upstream direction, the multiple upstream wavelength channels share the optical transmission medium of the ODN 130 in a WDM manner, each ONU 120 may work on one of the upstream wavelength channels of the multi-wavelength PON system 100, and each upstream wavelength channel may carry upstream services of one or more ONUs 120; the ONUs 120 that work on a same upstream wavelength channel may share the upstream wavelength channel in a Time Division Multiple Access (TDMA) manner.

In this embodiment, as shown in FIG. 2, a description is given by using an example in which the multi-wavelength PON system 100 has four upstream wavelength channels and downstream wavelength channels. It should be understood that in practical application, the number of the upstream and downstream wavelength channels of the multi-wavelength PON system 100 may also be determined according to network requirements. For ease of description, in this embodiment, the four upstream wavelength channels of the multi-wavelength PON system 100 are separately named an upstream wavelength channel 1 (which uses a first upstream wavelength $\lambda$ u1), an upstream wavelength channel 2 (which uses a second upstream wavelength $\lambda$ u2), an upstream wavelength channel 3 (which uses a third upstream wavelength $\lambda$ u3), and an upstream wavelength channel 4 (which uses a fourth upstream wavelength $\lambda$ u4); the four downstream wavelength channels of the multi-wavelength PON system 100 are separately named a downstream wavelength channel 1 (which uses a first downstream wavelength $\lambda$ d1), a downstream wavelength channel 2 (which uses a second downstream wavelength $\lambda$ d2), a downstream wavelength channel 3 (which uses a third downstream wavelength $\lambda$ d3), and a downstream wavelength channel 4 (which uses a fourth downstream wavelength $\lambda$ d4).

Each upstream wavelength channel and each downstream wavelength channel may have a corresponding wavelength channel identifier (such as a channel number). That is, the upstream wavelength channel identifier matches an upstream wavelength of an upstream wavelength channel identified by the upstream wavelength channel identifier, and the OLT 110 and the ONUs 120 may learn the upstream wavelength of the upstream wavelength channel according to the upstream wavelength channel identifier. Similarly, the downstream wavelength channel identifier also matches a downstream wavelength of a downstream wavelength channel identified by the downstream wavelength channel identifier, and the OLT 110 and the ONUs 120 may learn the downstream wavelength of the downstream wavelength channel according to the downstream wavelength channel identifier.

In an embodiment, referring to FIG. 2, the OLT 110 may include an optical coupler 111, a first wavelength division multiplexer 112, a second wavelength division multiplexer 113, multiple downstream optical transmitters Tx1-Tx4, multiple upstream optical receivers Rx1-Rx4, and a processing module 114. The multiple downstream optical transmitters Tx1-Tx4 are connected to the optical coupler 111 by using the first wavelength division multiplexer 112, the multiple upstream optical receivers Rx1-Rx4 are connected to the optical coupler 111 by using the second wavelength division multiplexer 113, and the coupler 111 is further connected to the feeder fiber 131 of the ODN 130.

Transmit wavelengths vary between the multiple downstream optical transmitters Tx1-Tx4. Each downstream optical transmitter of Tx1-Tx4 may correspond to one of the downstream wavelength channels of the multi-wavelength PON system 100. For example, the transmit wavelengths of the multiple downstream optical transmitters Tx1-Tx4 may be $\lambda$ d1-$\lambda$ d4. The downstream optical transmitters Tx1-Tx4 may use their respective transmit wavelengths $\lambda$ d1-$\lambda$ d4 to transmit downstream data to corresponding downstream wavelength channels separately so that the downstream data is received by the ONUs 120 that work on the downstream wavelength channels. Correspondingly, receive wavelengths may vary between the multiple upstream optical receivers Rx1-Rx4. Each upstream optical receiver of Rx1-Rx4 also corresponds to one of the upstream wavelength channels of the multi-wavelength passive optical network system 100. For example, the receive wavelengths of the multiple upstream optical receivers Rx1-Rx4 may be $\lambda$ u1-$\lambda$ u4. The upstream optical receivers Rx1-Rx4 may use their respective receive wavelengths $\lambda$ u1-$\lambda$ u4 to receive upstream data sent by the ONUs 120 that work on the corresponding upstream wavelength channels.

The first wavelength division multiplexer 112 is configured to: perform wavelength division multiplexing on the downstream data that is transmitted by the multiple downstream optical transmitters Tx1-Tx4 and whose wavelengths are $\lambda$ d1-$\lambda$ d4, so as to form a multi-wavelength downstream optical signal; and use the optical coupler 111 to send the multi-wavelength downstream optical signal to the feeder fiber 131 of the ODN 130, so as to provide the downstream data for the ONUs 120 by using the ODN 130. In addition, the optical coupler 111 may be further configured to provide the second wavelength division multiplexer 113 with multi-wavelength upstream optical signals (which include the upstream data whose wavelengths are $\lambda$ u1-$\lambda$ u4) that come from the multiple ONUs 120, and the second wavelength division multiplexer 113 may perform wavelength division demultiplexing on the multi-wavelength upstream optical signals to form the upstream data whose wavelengths are $\lambda$ u1-$\lambda$ u4, and provide the upstream data for the upstream optical receivers Rx1-Rx4 to perform data receiving.

The processing module 114 may be a Media Access Control (Media Access Control, MAC) module or a MAC chip. On the one hand, according to a downstream wavelength channel on which an ONU 120 works, the processing module 114 may provide the downstream data that is to be sent to the ONU 120 for a downstream optical transmitter corresponding to the downstream wavelength channel, so that the downstream optical transmitter transmits the downstream data to the wavelength channel; on the other hand, the processing module 114 may also process the upstream data received by each upstream optical receiver of Rx1-Rx4.

Working wavelengths (including upstream transmit wavelengths and downstream receive wavelengths) of the ONUs 120 are tunable. In a specific embodiment, each ONU 120 may include an optical coupler 121, a downstream optical receiver 122, an upstream optical transmitter 123, and a processing module 124. Both the downstream optical receiver 122 and the upstream optical transmitter 123 are wavelength-tunable components, and they may be connected to a drop fiber corresponding to the ONU 120 by using the optical coupler 121. On the one hand, the optical coupler 121 may provide the drop fiber 133 of the ODN 130 with the upstream data sent by the upstream optical transmitter 123, so as to send the upstream data to the OLT 110 through the ODN 130; on the other hand, the optical coupler 121 may further provide the downstream optical receiver 122 with the downstream data sent by the OLT 110 through the ODN 130, so as to perform data receiving.

The processing module 124 may be a MAC module or a MAC chip, and may perform wavelength negotiation with the processing module 114 of the OLT 110 to determine a working wavelength of the ONU 120. In addition, the processing module 124 may also provide, in a specified timeslot, the upstream optical transmitter 123 with the upstream data to be sent to the OLT 110, so that the upstream optical transmitter 123 sends the upstream data to the OLT 110 by using a corresponding upstream wavelength channel, and the processing module 124 further processes the downstream data received by the downstream optical receiver 122.

In the multi-wavelength PON system, because the OLT 110 supports multiple upstream and downstream wavelength channels and the working wavelengths of the ONUs 120 are tunable, in order to implement normal registration, the ONUs 120 need to perform wavelength negotiation with the OLT 110 first during initialization. An embodiment of the present invention provides a wavelength negotiation method of a multi-wavelength PON system, where the method can ensure fast registration of an ONU and prevent interference on normal communication of other ONUs.

Figure 3:
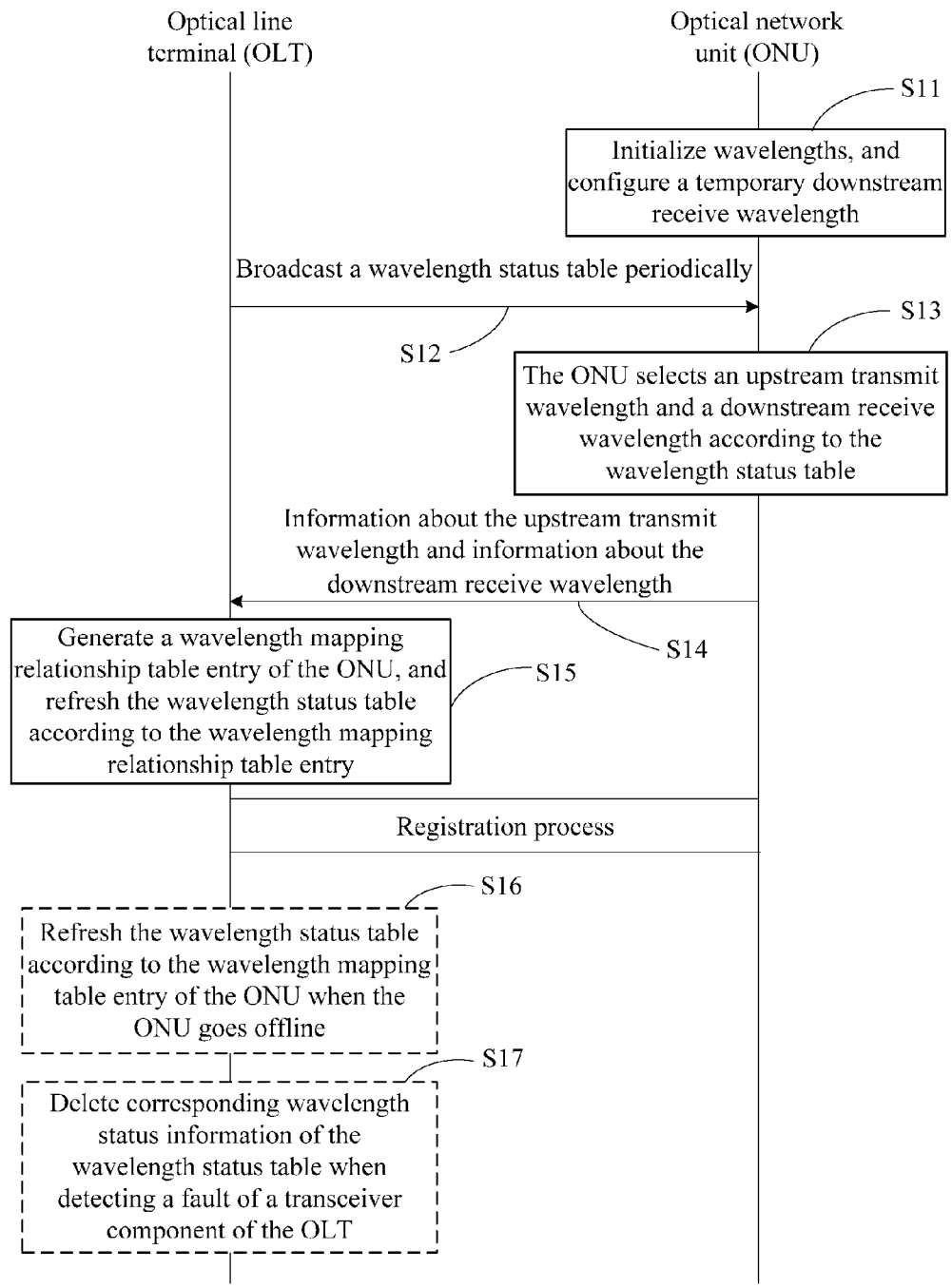
FIG. 3 is a flowchart of an embodiment of a wavelength negotiation method of a multi-wavelength passive optical network according to the present application.

FIG. 3 is a flowchart of a wavelength negotiation method of a multi-wavelength passive optical network according to an embodiment of this application. The wavelength negotiation method may include:

Step S11: An ONU performs wavelength initialization before sending a registration request, and configures a temporary downstream receive wavelength.

When gaining access to a multi-wavelength PON system for the first time, the ONU may perform the wavelength initialization first before sending the registration request to the OLT. For example, the ONU may search for downstream data from the OLT by gradually adjusting a downstream receive wavelength of the ONU. If the ONU finds, at a specified moment, that a downstream optical signal can be received from the OLT over a downstream receive wavelength to which a downstream optical receiver of the ONU is currently adjusted and that a MAC module of the ONU can obtain a correct downstream data frame by parsing the downstream optical signal, the ONU may deem that the downstream receive wavelength to which the downstream optical receiver of the ONU is currently adjusted is a downstream wavelength of a wavelength channel of the multi-wavelength PON system. In this case, the ONU may configure the current downstream receive wavelength as the temporary downstream receive wavelength, and stop the adjustment of the downstream receive wavelength.

Step S12: An OLT periodically broadcasts a wavelength status table on each downstream wavelength channel of a multi-wavelength PON system.

The wavelength status table primarily records wavelength status information of each wavelength channel of the multi-wavelength PON system. For example, the wavelength status table may indicate information about available wavelengths of the multi-wavelength PON system and statistic information of registered ONUs of a corresponding wavelength channel. A field format (for example, values of main fields and field lengths) and an arrangement order of the wavelength status table may be determined according to specific implementation conditions.

In an embodiment, the wavelength status table may include a list of currently available upstream wavelengths and a list of currently available downstream wavelengths, and statistic information of registered ONUs of a wavelength channel corresponding to each wavelength in the list of the available upstream wavelengths and the list of the available downstream wavelengths, for example, the number of ONUs registered with the wavelength channel. In another embodiment, the wavelength status table may include a binding relationship list of currently available upstream/downstream transmit/receive wavelengths (that is, the OLT binds the available upstream wavelengths and the available downstream wavelengths to form upstream/downstream transmit/receive wavelength pairs), and statistic information of registered ONUs of a wavelength channel corresponding to each upstream/downstream transmit/receive wavelength pair in the binding relationship list of the currently available upstream/downstream transmit/receive wavelengths.

Step S13: The ONU selects an upstream transmit wavelength and a downstream receive wavelength according to the wavelength status table.

Because the OLT broadcasts the wavelength status table to each wavelength channel, the ONU may receive the wavelength status table from the OLT by using the temporary downstream receive wavelength. According to the wavelength status information of each wavelength channel recorded in the wavelength status table and in view of a transmit/receive wavelength capability supported by the ONU, the ONU can select its upstream and downstream wavelengths.

For example, in an embodiment, the ONU may select, from the list of the available upstream wavelengths in the wavelength status table, an available upstream wavelength as its upstream working wavelength, that is, as the upstream transmit wavelength of the ONU. Similarly, the ONU may select, from the list of the available downstream wavelengths in the wavelength status table, an available downstream wavelength as its downstream working wavelength, that is, as the downstream receive wavelength of the ONU. Alternatively, in another embodiment, the ONU may also select, from the binding relationship list of the currently available upstream/downstream wavelengths in the wavelength status table, one of the upstream/downstream transmit/receive wavelength pairs as upstream and downstream working wavelengths, that is, as the upstream transmit wavelength and the downstream receive wavelength of the ONU.

Taking load balancing into account, when selecting wavelengths according to the wavelength status table, the ONU may select wavelengths or a wavelength pair with a smaller number of registered ONUs according to the number of registered ONUs of the wavelength channel corresponding to each upstream/downstream wavelength or each upstream/downstream transmit/receive wavelength pair, and accordingly, set the upstream transmit wavelength and the downstream receive wavelength of the ONU.

Further, according to the upstream transmit wavelength and downstream receive wavelength selected by the ONU, the ONU may set corresponding tunable transceiver components such as a tunable optical transmitter and a tunable optical receiver inside the ONU.

Step S14: The ONU reports information about the selected upstream transmit wavelength and information about the selected downstream receive wavelength to the OLT.

The ONU may record identifiers of the upstream transmit wavelength and downstream receive wavelength currently selected by the ONU, add the information about the upstream transmit wavelength and the information about the downstream receive wavelength into an upstream data frame or another upstream message sent to the OLT, and report the information to the OLT by using the upstream data frame or the upstream message.

In a specific embodiment, the information about the upstream transmit wavelength and the information about the downstream receive wavelength may be carried in an XGPON transmission convergence (XGPON Transmission Convergence, XGTC) frame, a GPON transmission convergence (GPON Transmission Conversion, GTC) frame, or an Ethernet frame (that is, EPON frame) with a logic link identifier (Logic Link Identifier, LLID).

Figure 4:
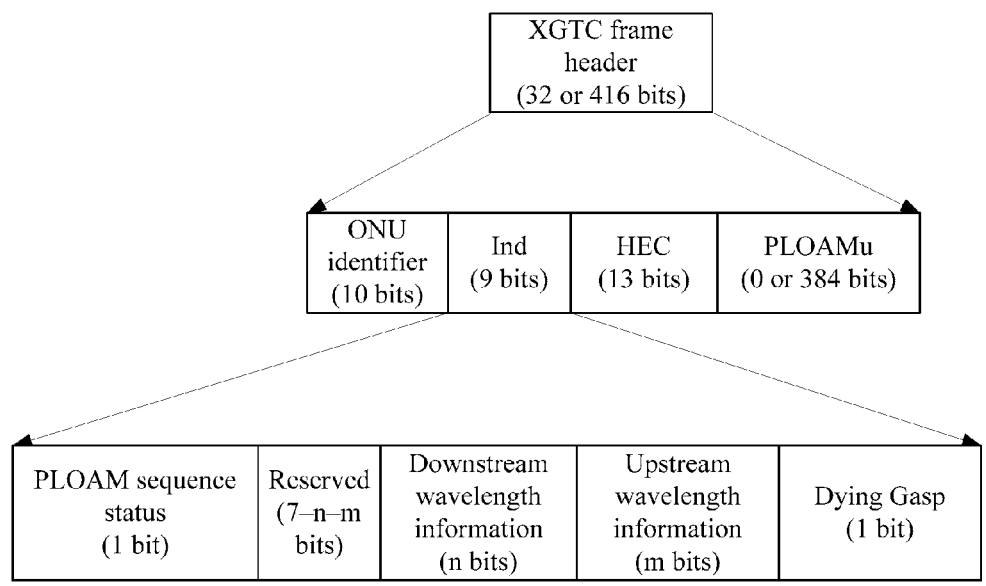
FIG. 4 is a schematic diagram in which an XGTC frame is used to carry wavelength information in the wavelength negotiation method of the multi-wavelength passive optical network shown in FIG. 3.

An example is used, in which the information about the upstream transmit wavelength and the information about the downstream receive wavelength are carried in an XGTC frame. Referring to FIG. 4, the XGTC frame includes an XGTC frame header and an XGTC payload, where the XGTC frame header includes an optical network unit identifier (ONU-ID) field, an indication (Ind) field, a hybrid error correction (Hybrid Error Correction, HEC) field, and a physical layer operations, administration and maintenance upstream (Physical Layer Operations, Administration and Maintenance upstream, PLOAMu) field, where the information about the downstream wavelength and the information about the upstream wavelength may be carried in the Ind field. For example, a 9-bit reserved (Reserve) field is reserved in the Ind field of the XGTC frame header defined in the XGPON standard. In this embodiment, the information about the downstream wavelength and the information about the upstream wavelength may be carried in the reserved field of the Ind field of the XGTC frame header, as shown in FIG. 4.

Alternatively, in other embodiments, the information about the upstream transmit wavelength and the information about the downstream receive wavelength may be carried in a physical layer operations, administration and maintenance (Physical Layer Operations, Administration and Maintenance, PLOAM) message, an ONT management and control interface (ONT Management and Control Interface, OMCI) message, a Multi-Point Control Protocol (Multi-Point Control Protocol, MPCP) message, or an operation, administration and maintenance (Operation Administration and Maintenance, OAM) message. A specific message format, such as a field value and a field length, may be determined according to actual requirements.

Step S15: The OLT generates a wavelength mapping relationship table entry of the ONU according to the information about the upstream transmit wavelength and the information about the downstream receive wavelength that are reported by the ONU, and refreshes the wavelength status table according to the wavelength mapping relationship table entry.

After receiving the upstream data frame or the upstream message that is sent by the ONU and carries the information about the upstream transmit wavelength and the information about the downstream receive wavelength, the OLT may extract ONU identification information (such as an ONU-ID) and the information about the upstream transmit wavelength and the information about the downstream receive wavelength from the upstream data frame or the upstream message, and generate the wavelength mapping relationship table entry. That is, the wavelength mapping relationship table entry may include the ONU identification information and the information about the upstream transmit wavelength and the information about the downstream receive wavelength of the ONU. In addition, wavelength mapping relationship table entries corresponding to all ONUs may form a wavelength mapping relationship table.

According to the wavelength mapping relationship table entry, the OLT may further refresh the wavelength status table in the OLT. The OLT may update the number of registered ONUs of a corresponding upstream wavelength in the list of the available upstream wavelengths in the wavelength status table of the OLT according to the information about the upstream transmit wavelength in the wavelength mapping relationship table entry of the ONU, and update the number of registered ONUs of a corresponding downstream wavelength in the list of the available downstream wavelengths in the wavelength status table of the OLT according to the information about the downstream receive wavelength in the wavelength mapping relationship table entry of the ONU. Alternatively, the OLT may update the number of registered ONUs of a corresponding upstream/downstream transmit/receive wavelength pair in the binding relationship list of the available upstream/downstream transmit/receive wavelengths in the wavelength status table of the OLT according to the information about the upstream transmit wavelength in the wavelength mapping relationship table entry of the ONU.

Subsequently, the ONU may use the selected upstream transmit wavelength and downstream receive wavelength to enter a normal registration process, send a registration request to the OLT, and complete registration.

Further, in a specific embodiment, after the registration succeeds, the ONU may record current upstream and downstream working wavelengths locally. After its working wavelengths are changed successfully according to a command issued by the OLT, the ONU needs to refresh records of the upstream and downstream working wavelengths in a timely manner. Based on the records of the upstream and downstream working wavelengths, upon next re-registration, the ONU may set the upstream transmit wavelength and the downstream receive wavelength by reading the upstream and downstream working wavelengths directly, instead of performing step S11 again in which the downstream data from the OLT is searched for by adjusting the downstream receive wavelength. After performing the wavelength setting in the re-registration process, if the ONU does not receive the downstream data from the OLT within specified time, the ONU may perform step S11 again to search for the downstream data from the OLT by adjusting the downstream receive wavelength. In step S11, when the ONU does not receive the downstream sent by the OLT even if all downstream receive wavelengths supported by the ONU are traversed, it may be deemed that a fiber is faulty, a transceiver component of the OLT is faulty, or an OLT wavelength capability is mismatched at this time.

Optionally, in a specific embodiment, the wavelength negotiation method may further include:

Step S16: The OLT refreshes the wavelength status table according to the wavelength mapping table entry of the ONU when the ONU goes offline.

When the ONU goes offline, the OLT may detect a LOSi (Loss of signal, loss of signal) alarm related to the ONU. In this case, according to the wavelength mapping table entry related to the ONU in the wavelength mapping table, the OLT may learn the information about the upstream transmit wavelength and the information about the downstream receive wavelength of the ONU, and accordingly, update the numbers of registered ONUs of the corresponding wavelengths in the upstream wavelength list and the downstream wavelength list in the wavelength status table, or update the number of registered ONUs of a corresponding upstream/downstream transmit/receive wavelength pair in the binding relationship list of the available upstream/downstream transmit/receive wavelengths in the wavelength status table.

Step S17: The OLT deletes corresponding wavelength status information of the wavelength status table when detecting a fault of a transceiver component of the OLT.

In a working process, the OLT may also detect performance parameters of its transceiver component (such as an upstream optical receiver or a downstream optical transmitter). If it is detected that the transceiver component is faulty, it means that the wavelength channel on which the transceiver component works is temporarily unavailable due to a fault. Therefore, the OLT may delete the corresponding wavelength status information of the wavelength status table according to the working wavelength (such as an upstream receive wavelength or a downstream transmit wavelength) used by the transceiver component. For example, the OLT may delete corresponding wavelength table entries in the upstream wavelength list and the downstream wavelength list in the wavelength status table, or delete a corresponding upstream/downstream transmit/receive wavelength pair table entry in the binding relationship list of the available upstream/downstream transmit/receive wavelengths in the wavelength status table.

In the wavelength negotiation method of the multi-wavelength PON provided in this embodiment, by receiving a wavelength status table broadcast by an OLT, an ONU may learn wavelength status information of each wavelength channel of a multi-wavelength PON system and select a proper working wavelength in view of a wavelength capability of the ONU, so as to prevent a need of re-negotiation caused by a wavelength conflict of the wavelength selected by the ONU, which can shorten registration time on the one hand and can prevent interference on communication of other normally working ONUs on the other hand. In addition, the ONU selects the working wavelength according to wavelength status information of each wavelength channel, which can also implement load balancing between all wavelength channels and improve overall performance of the multi-wavelength PON system.

In specific implementation, from a perspective of operation and maintenance, a network operator may require that multiple ONUs located in a specified area share one or more specified wavelengths, or, in order to implement open access, the network operator may require that a user-side ONU of an operator use only a specified wavelength or wavelength set. That is, in a practical multi-wavelength PON system, the operator may require that the ONU satisfy a specified wavelength requirement. However, in the foregoing embodiment, the upstream and downstream working wavelengths selected, before the registration, by the ONU according to the wavelength status table provided by the OLT are unpredictable to the OLT, and the upstream and downstream working wavelengths selected by the ONU may be unable to satisfy the specified wavelength requirement. To solve the foregoing problem, in another embodiment of this application, several wavelength confirmation steps are added on the basis of the foregoing embodiment to ensure that the working wavelengths negotiated between the ONU and the OLT satisfy an expected wavelength requirement.

Figure 5:
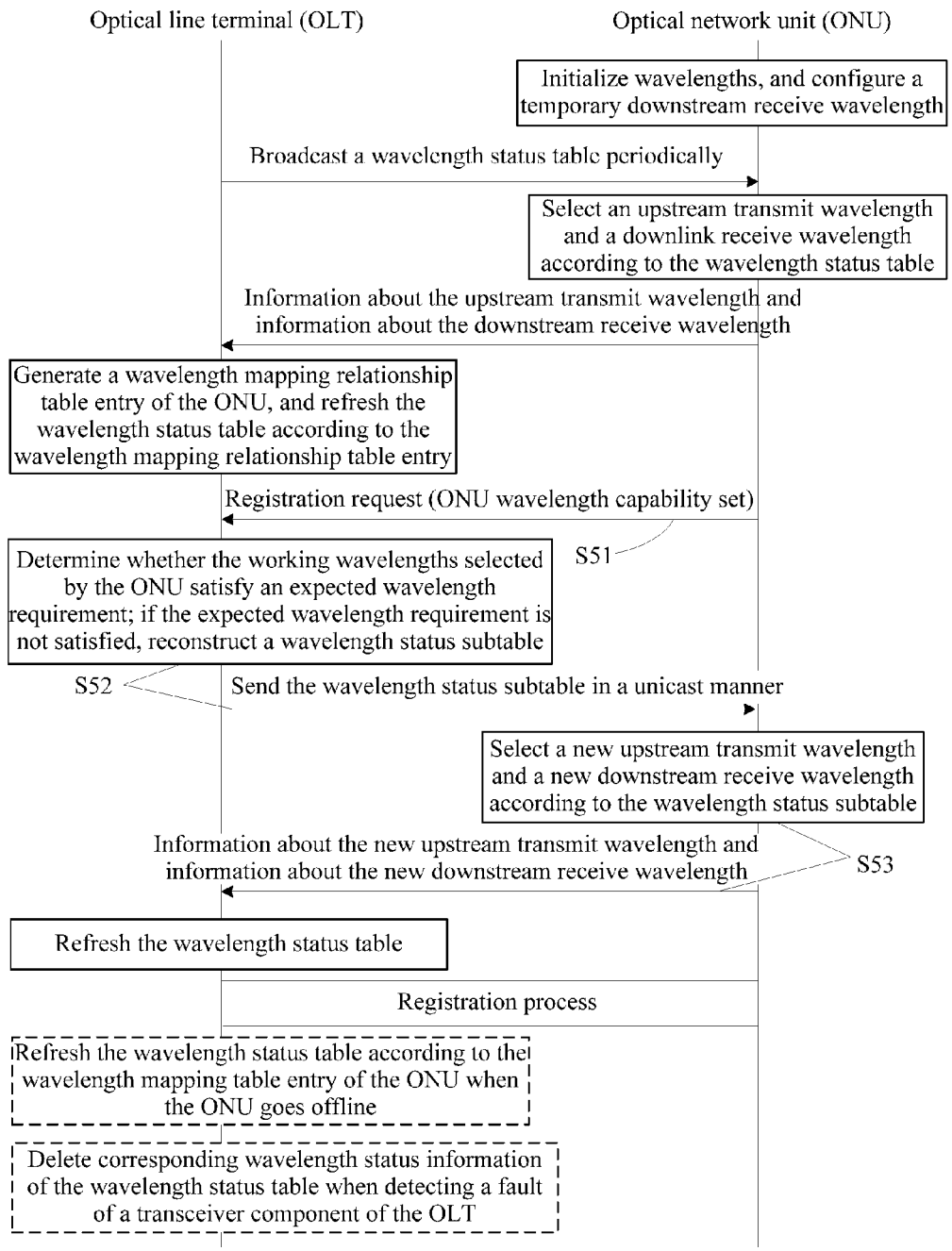
FIG. 5 is a flowchart of another embodiment of a wavelength negotiation method of a multi-wavelength passive optical network according to the present application.

Refer to FIG. 5, which is a schematic flowchart of a wavelength negotiation method of a multi-wavelength PON according to another embodiment of this application. Compared with the wavelength negotiation method shown in FIG. 3, the wavelength negotiation method in this embodiment primarily adds the following steps:

Step S51: The ONU reports its own wavelength capability set to the OLT.

When sending the registration request or after the registration succeeds, the ONU reports its own wavelength capability set to the OLT. The wavelength capability set of the ONU primarily includes but is not limited to indication information indicating whether the ONU supports adjustment of the upstream/downstream transmit/receive wavelength, lists of upstream wavelengths and downstream wavelengths supported by the ONU or a list of upstream/downstream transmit/receive wavelength pairs supported by the ONU, wavelength adjustment time of the ONU, and the like.

Step S52: The OLT determines whether the working wavelengths selected by the ONU satisfy the expected wavelength requirement. If the expected wavelength requirement is not satisfied, the OLT reconstructs a wavelength status subtable according to the expected wavelength requirement of the ONU and in view of the wavelength capability set reported by the ONU, and sends the wavelength status subtable to the ONU in a unicast manner.

Specifically, the OLT may perform wavelength decision according to the information about the upstream transmit wavelength and the information about the downstream receive wavelength that are reported by the ONU by using the upstream data frame or the upstream message, and determine whether the working wavelengths (that is, the upstream transmit wavelength or downstream receive wavelength) selected by the ONU satisfy the expected wavelength requirement. If the expected wavelength requirement of the ONU is satisfied, the OLT may complete the registration process of the ONU. If the expected wavelength requirement of the ONU is not satisfied, the OLT may re-determine, according to the expected wavelength requirement of the ONU and in view of the wavelength capability set reported by the ONU, an available upstream wavelength and an available downstream wavelength of the ONU or an available upstream/downstream transmit/receive wavelength pair, and the statistic information of registered ONUs of the wavelength channel corresponding to the available upstream wavelength and the available downstream wavelength or the available upstream/downstream transmit/receive wavelength pair, so as to construct the wavelength status subtable related to the ONU.

Step S53: The ONU selects a new upstream transmit wavelength and a new downstream receive wavelength according to the wavelength status subtable, and reports information about the new upstream transmit wavelength and information about the new downstream receive wavelength to the OLT.

Subsequently, the OLT may update the wavelength mapping relationship table entry of the ONU according to the information about the new upstream transmit wavelength and the information about the new downstream receive wavelength that are reported by the ONU, and refresh the wavelength status table. Then, the ONU may use the selected new upstream transmit wavelength and new downstream receive wavelength to enter a normal registration process, send a new registration request to the OLT, and complete registration.

Figure 6:
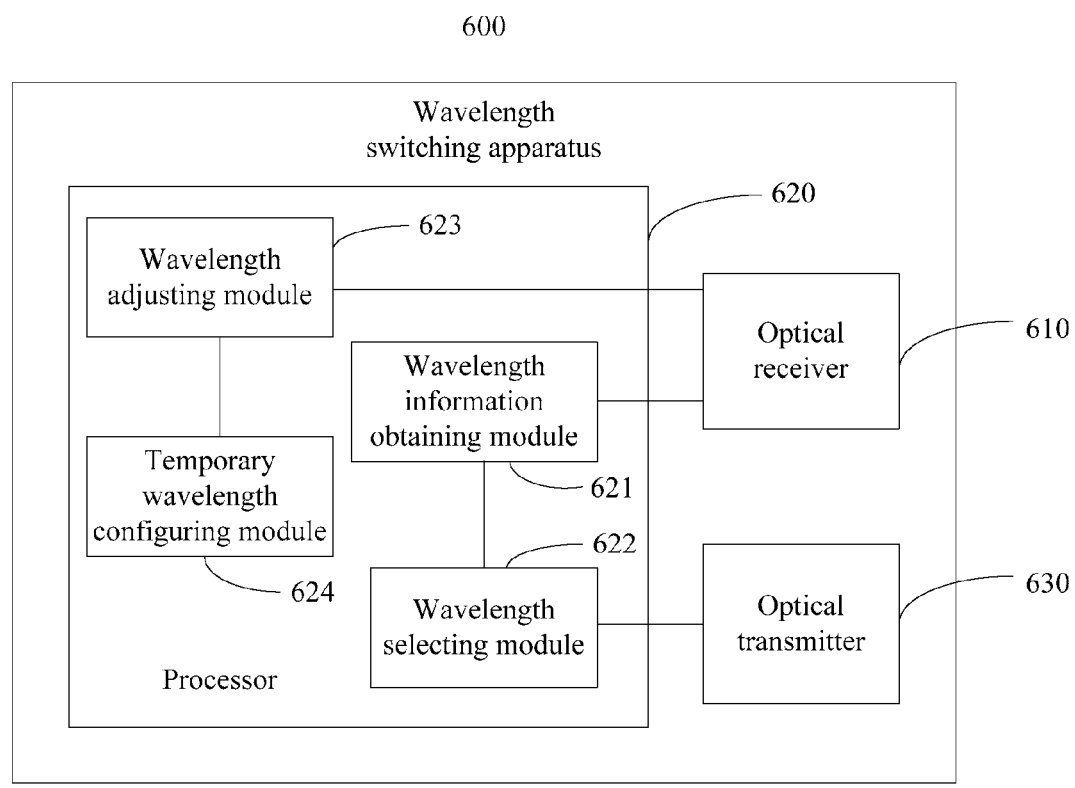
FIG. 6 is a schematic structural diagram of an embodiment of a wavelength switching apparatus of a multi-wavelength passive optical network according to the present application.

Based on the wavelength negotiation method described in the foregoing embodiment, this application further provides a wavelength negotiation apparatus of a multi-wavelength PON, where the wavelength negotiation apparatus may be applied to an ONU 120 in the multi-wavelength PON system 100 shown in FIG. 2. Referring to FIG. 6, which is a schematic structural diagram of an embodiment of a wavelength negotiation apparatus of a multi-wavelength PON according to this application, the wavelength negotiation apparatus 600 may include:

an optical receiver 610, configured to receive a wavelength status table that is broadcast by an OLT over each downstream wavelength channel of a multi-wavelength PON system, where the wavelength status table is used to indicate information about available wavelengths of the multi-wavelength PON system and statistic information of registered optical network units ONUs of a corresponding wavelength channel;

a processor 620, configured to select an upstream transmit wavelength and a downstream receive wavelength according to the wavelength status table; and an optical transmitter 630, configured to report information about the upstream transmit wavelength and information about the downstream receive wavelength to the OLT so that the OLT refreshes the wavelength status table.

In an embodiment, the wavelength status table includes a list of currently available upstream wavelengths and a list of currently available downstream wavelengths, and the number of registered ONUs of a wavelength channel corresponding to each wavelength in the list of the available upstream wavelengths and the list of the available downstream wavelengths. In addition, the processor 620 may include:

a wavelength information obtaining module 621, configured to: obtain, from the list of the currently available upstream wavelengths and the list of the currently available downstream wavelengths, information about the available upstream wavelengths and information about the available downstream wavelengths, and the number of registered ONUs of a wavelength channel corresponding to each available upstream wavelength or each available downstream wavelength; and a wavelength selecting module 622, configured to select an available upstream wavelength and an available downstream wavelength that correspond to a wavelength channel with a smaller number of registered ONUs as the upstream transmit wavelength and the downstream receive wavelength respectively.

In another embodiment, the wavelength status table includes a binding relationship list of currently available upstream/downstream transmit/receive wavelengths, and the number of registered ONUs of a wavelength channel corresponding to each upstream/downstream transmit/receive wavelength pair in the binding relationship list of the currently available upstream/downstream transmit/receive wavelengths; the processor 620 may include:

a wavelength information obtaining module 621, configured to: obtain, from the binding relationship list of the available upstream/downstream transmit/receive wavelengths, information about available upstream/downstream transmit/receive wavelength pairs, and the number of registered ONUs of a wavelength channel corresponding to information about each available upstream/downstream transmit/receive wavelength pair; and a wavelength selecting module 622, configured to select an available upstream/downstream transmit/receive wavelength pair that corresponds to a wavelength channel with a smaller number of registered ONUs as the upstream transmit wavelength and the downstream receive wavelength.

In an embodiment, the processor 620 may be further configured to perform wavelength initialization before sending a registration request, and configure a temporary downstream receive wavelength, where the temporary downstream receive wavelength is used as a receive wavelength for receiving the wavelength status table. For example, the processor 620 may further include:

a wavelength adjusting module 623, configured to search for downstream data from the OLT by gradually adjusting the downstream receive wavelength before sending the registration request; and a temporary wavelength configuring module 624, configured to: when it is found that a downstream optical signal can be received from the OLT over a downstream receive wavelength to which the downstream receive wavelength is currently adjusted and that a correct downstream data frame can be obtained by parsing the downstream optical signal, configure the current downstream receive wavelength as the temporary downstream receive wavelength and stop the adjustment of the downstream receive wavelength.

In an embodiment, the optical transmitter 630 may be further configured to report an ONU wavelength capability set to the OLT when sending a registration request or after registration succeeds; the optical receiver 610 is further configured to receive a wavelength status subtable that is reconstructed and returned in a unicast manner by the OLT when it is determined that the selected upstream transmit wavelength or downstream receive wavelength does not meet an expected wavelength requirement; the processor 620 may be further configured to select a new upstream transmit wavelength and a new downstream receive wavelength according to the wavelength status subtable, where the wavelength status subtable includes information about available wavelengths in transmit/receive wavelengths supported by the ONU and the statistic information of the registered ONUs of the corresponding wavelength channel. In addition, the optical transmitter 630 may be further configured to report the selected new upstream transmit wavelength and new downstream receive wavelength to the OLT so that the OLT further refreshes the current wavelength status table.

It should be understood that the foregoing description is merely an overview of main functions of each function module of the wavelength negotiation apparatus 600. For a detailed working process of the function modules, reference may be made to the wavelength negotiation method described in the foregoing embodiment.

In addition, the division into the function modules is mainly based on specific functions in wavelength negotiation. In a specific embodiment, when the wavelength negotiation apparatus 600 is applied to the ONU 120 in the multi-wavelength passive optical network system 100 shown in FIG. 2, the optical receiver 610 may be implemented by the downstream optical receiver 122 of the ONU 120 and a related drive module, the optical transmitter 630 may be implemented by the upstream optical transmitter 123 of the ONU 120 and a related drive module, and the processor 620 may be implemented by the MAC chip 124 of the ONU 120. Specifically, each function module of the processor 620, such as the wavelength information obtaining module 621, the wavelength selecting module 622, the wavelength adjusting module 623, and the temporary wavelength configuring module 624, may be implemented by a software module of the MAC chip 124. Alternatively, each function module of the wavelength negotiation apparatus 600 may also be implemented by other hardware entities.

In addition, in other alternative embodiments, the wavelength negotiation apparatus 600 may also be implemented inside a processor chip. That is, the wavelength negotiation method provided in the foregoing embodiment may be executed inside the processor chip as a software program.

Based on the foregoing descriptions of the embodiments, a person skilled in the art may clearly understand that the present invention may be implemented by software in addition to a necessary hardware platform or by hardware only. Based on such an understanding, all or the part of the technical solutions of the present invention contributing to the technology in the background part may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely exemplary specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wavelength negotiation method of a multi-wavelength passive optical network (PON), the method comprising:
receiving, by an optical network unit (ONU), information, including parameters, pertaining to several downstream wavelength channels of the multi-wavelength PON from an Optical line terminal (OLT), wherein the information indicates several available downstream wavelengths for the OLT;
selecting, by the ONU, a downstream wavelength channel from the several downstream wavelength channels;
reporting, by the ONU, the parameters pertaining to the selected downstream wavelength channel as a downstream working wavelength channel to the OLT; and
reporting, by the ONU, a wavelength capability set of the ONU that indicates available downstream wavelengths for the ONU among the several available downstream wavelengths of the OLT, wherein a wavelength associated with the selected downstream wavelength channel is among the reported wavelength capability set.

2. The wavelength negotiation method according to claim 1, wherein the parameters pertaining to several downstream wavelength channels of the multi-wavelength PON comprise downstream wavelength channel identifiers (ID).

3. A multi-wavelength passive optical network (PON) comprising:
at least one optical line terminal (OLT); and
multiple optical network units (ONUs),
wherein the at least one OLT is connected to the multiple ONUs in a point-to-multipoint manner by using an optical distribution network, wherein the each of ONUs is configured to provide the method of claim 1.

4. The multi-wavelength passive optical network PON according to claim 3, wherein the parameters pertaining to several downstream wavelength channels of the multi-wavelength PON comprise downstream wavelength channel identifiers (ID).

5. The wavelength negotiation method according to claim 1, further comprising:
reporting parameters pertaining to another downstream wavelength channel among the reported wavelength capability set which is further selected by the ONU after being notified that the selected downstream wavelength channel is not suitable.

6. The wavelength negotiation method according to claim 1, wherein the wavelength capability set of the ONU comprises information indicating at least one of (a) whether the ONU supports adjustment of the upstream/downstream transmit/receive wavelength, (b) lists of upstream wavelengths and downstream wavelengths supported by the ONU, (c) a list of upstream/downstream wavelength pairs supported by the ONU, and (d) wavelength adjustment time of the ONU.

7. The wavelength negotiation method according to claim 1, further comprising:
receiving parameters pertaining to several upstream wavelength channels which indicates several available upstream wavelengths of the OLT;
selecting an upstream wavelength channel from the several upstream wavelength channels; and
reporting parameters pertaining to the selected upstream wavelength channel as an upstream working wavelength channel to the OLT.

8. An optical network unit (ONU) configured to:
receive information, including parameters, pertaining to several downstream wavelength channels of a multi-wavelength passive optical network (PON) from an optical line terminal (OLT), wherein the information indicates several available downstream wavelengths for the OLT;
select a downstream wavelength channel from the several downstream wavelength channels;
report the parameters pertaining to the selected downstream wavelength channel as a downstream working wavelength channel to the OLT; and
report a wavelength capability set of the ONU that indicates available downstream wavelengths for the ONU among the several downstream wavelengths of the OLT, wherein a wavelength associated with the selected wavelength channel is among the reported wavelength capability set.

9. The ONU according to claim 8, wherein the parameters pertaining to several downstream wavelength channels of the multi-wavelength PON comprises a downstream wavelength channel identifiers (ID).

10. The ONU according to claim 8, further configured to:
report parameters pertaining to another downstream wavelength channel among the reported wavelength capability set which is further selected by the ONU after being notified that the selected downstream wavelength channel is not suitable.

11. The ONU according to claim 8, wherein the wavelength capability set of the ONU comprises information indicating at least one of whether the ONU supports adjustment of the upstream/downstream transmit/receive wavelength, lists of upstream wavelengths and downstream wavelengths supported by the ONU, a list of upstream/downstream wavelength pairs supported by the ONU, or wavelength adjustment time of the ONU.

12. The ONU according to claim 8, further configured to:
receive parameters pertaining to several upstream wavelength channels which indicates several available upstream wavelengths of the OLT;

select an upstream wavelength channel from the several upstream wavelength channels; and report parameters pertaining to the selected upstream wavelength channel as an upstream working wavelength channel to the OLT.

* * * * *